United States Patent [19]
Paul et al.

[11] Patent Number: 5,397,922
[45] Date of Patent: Mar. 14, 1995

[54] INTEGRATED THERMO-ELECTRO ENGINE

[76] Inventors: Marius A. Paul; Ana Paul, both of 1120 E. Elm Ave., Fullerton, Calif. 92631

[21] Appl. No.: 54,050
[22] Filed: Jul. 2, 1993
[51] Int. Cl.⁶ ............... H02K 33/00; H02K 35/00
[52] U.S. Cl. ............... 290/1 A; 123/149 H; 123/149 R; 290/1 R; 310/15; 310/27
[58] Field of Search ............ 123/51 B, 149 R, 149 H; 290/1 R, 1 A; 310/15, 27

[56] References Cited
U.S. PATENT DOCUMENTS

| | | | |
|---|---|---|---|
| 3,105,153 | 9/1963 | James, Jr. | 290/1 R |
| 3,206,609 | 9/1965 | Dawes | 290/1 R |
| 4,631,455 | 12/1986 | Toishoff | 290/1 R |
| 4,809,646 | 3/1989 | Paul et al. | 123/51 B |

Primary Examiner—A. D. Pellinen
Assistant Examiner—Robert Lloyd Hoover
Attorney, Agent, or Firm—Bielen, Peterson & Lampe

[57] ABSTRACT

An internal combustion unit having a cylinder with at least one power piston with thermal means for reciprocating the power piston in the cylinder, the power piston and cylinder defining a combustion chamber, and a generator unit having a linear inductor piston coupled to the power piston for reciprocation together with the power piston and a stationary coil stator constructed in the configuration of an annulus, wherein the inductor piston reciprocates in the annulus of the coil stator and electrical current is generated in the stator.

10 Claims, 5 Drawing Sheets

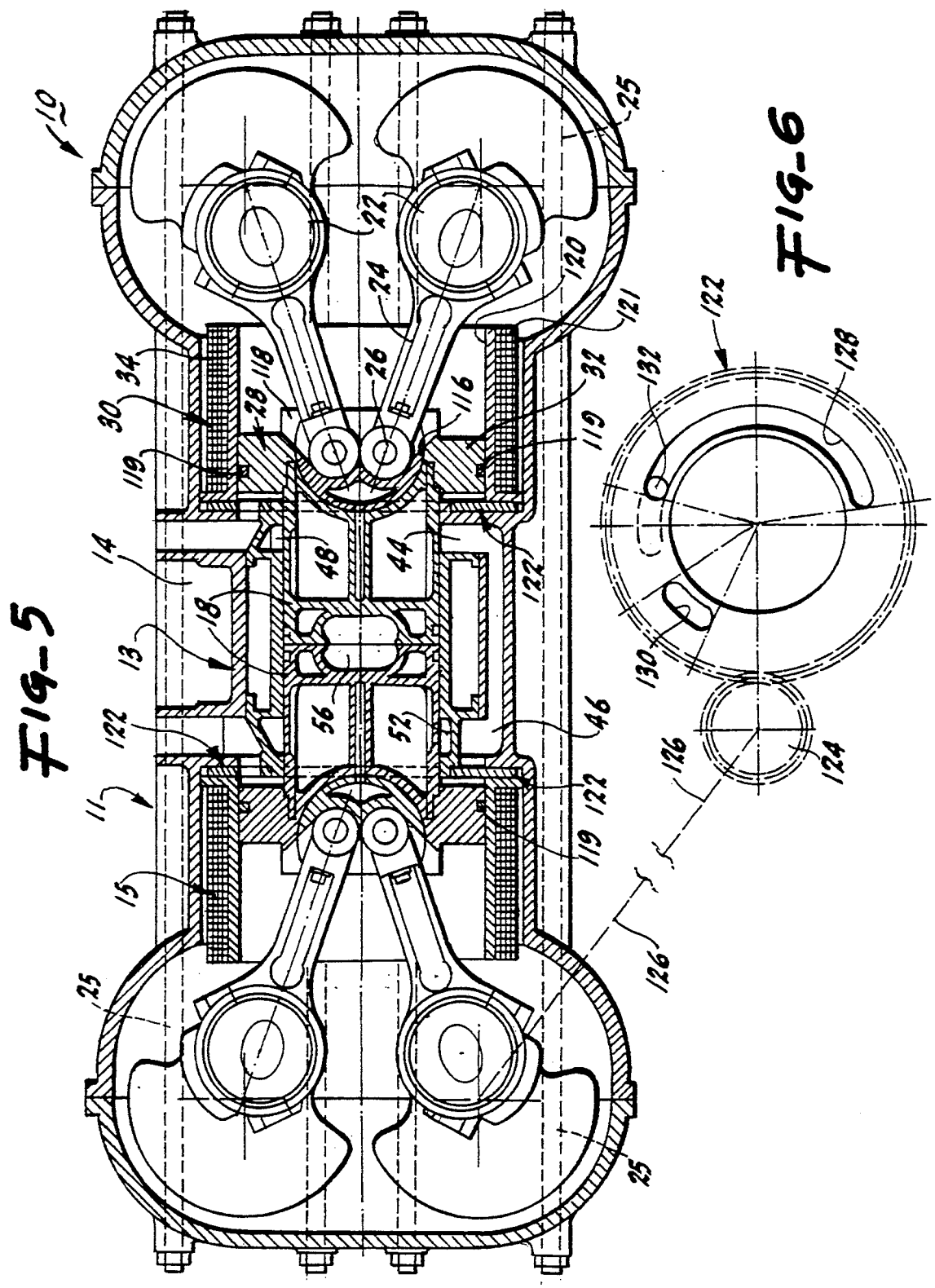

INTEGRATED THERMO-ELECTRO ENGINE

BACKGROUND OF THE INVENTION

The hybrid, thermo-electric engine of this invention integrates a highly efficient, high-pressure, internal combustion reciprocator with a linear electrical generator for generation of mechanical power and electrical energy. Depending on the sizing of the linear generator, the effective mechanical work can be reduced to only that sufficient to operate mechanical components of the engine, or, can be the predominant output power for the hybrid engine. In the designs shown in the specification of this invention, the hybrid engine is constructed for general use, such as the application of the engine to vehicle propulsion, particularly where a small engine is utilized as a generator in a vehicle propelled by electrical motors using an on-board electrical supply. Because of the extreme high efficiency of the internal combustion reciprocator of the preferred embodiment, the design of the engine is competitive with an all-electric vehicle in an adjusted pollution rating. Where stationary power plant pollution is factored into electricity delivery for an all-electric vehicle, the thermo-electric engine system will likely generate less pollution than a so-called "zero emission" all-electric vehicles. While designed for efficient use of diesel fuel, the engine can accommodate multiple liquid fuels and with reconfiguration of the fuel delivery system, can utilize natural gas for the ultimate in low-pollution power production.

The integrated thermo-electric engine of this invention provides direct conversion of thermal energy to electrical power and may be utilized as a stationary power generator as well as for vehicular propulsion. The engine has a combined opposed piston, internal-combustion reciprocator with pistons having an attached, linear inductor that coacts with a linear coil-stator, in a single housing unit. The principles of a linear inductor generator or linear inductor motor are well known. An example of adaption of a linear inductor generator/motor to a reciprocal engine is taught in Taishoff, U.S. Pat. No. 4,631,455, issued Dec. 23, 1986. The engine converts reciprocal motion developed by the opposed pistons directly into an alternating or redefined into direct electrical current. The production of electrical power is particularly adapted to vehicle propulsion because of the compact and lightweight size of the power plant for power produced. The reciprocating inductor of the reciprocator unit can be utilized to compress air for direct supply to the combustion chamber. Additionally, the reciprocator unit can be combined with auxiliary components for turbo charging or roto-expander charging of the engine when high efficiencies are desired.

The thermo-electric engine of this invention can be utilized wherever it is desirable to convert thermal energy directly into electrical energy. As noted, where it is desirable to include a mechanical power take-off, the electrical generating feature of this invention can be down-sized to substitute for an alternator or generator in conventional applications.

SUMMARY OF THE INVENTION

The integrated thermo-electric engine of this invention integrates a high-pressure, internal combustion having an opposed-piston reciprocator, with an electrical power generator unit having a linear inductor that coacts with a linear coil-stator for conversion of thermal energy into electrical energy. The opposed-piston reciprocator is of a type that is described in U.S. Pat. No. 4,809,646, issued Mar. 7, 1989. The internal combustion unit is modified to include a pair of linear inductor pistons that are coupled to the reciprocating power pistons of the engine. The inductor pistons coact with a pair of stationary linear coil-stators that are mounted in the form of an annulus within a combined housing for both the combustor unit and the generator unit. The opposed power pistons are each connected to dual crankshafts by a pair of connecting rods having parallel wrist pins in mutual rolling contact seated in bearings in each piston. The twin connecting rods connect to the dual crankshafts-at their opposite end for opposed rotation of the two crankshafts associated with each piston. The rolling wrist pins and twin connecting rods provide for elimination of side thrust of the piston and provide stabilization for close tolerance reciprocation of the linear inductor piston within the linear coil-stator. The reciprocating linear inductor piston is of a greater diameter than the power piston to provide a stepped, piston assembly configuration. In this manner the linear inductor piston is designed to have the dual function as a linear inductor and a positive-displacement linear compressor. For improved performance, the integrated thermo-electric engine can in certain embodiments include additional air compression by use of a turbocharger and/or a turbocharger coupled with a positive-displacement, rotary compressor-expander. In such configuration, the high pressure exhaust gases of the combustion unit are passed to the turbine section of the turbocharger, or passed first to the expander section of the rotary compressor-expander for transfer to the turbine section of the turbo compressor. The added components provide a thermal dynamic cascade of the peak pressures and temperatures achieved in the combustor unit to final exhaust. By use of an appropriate computer controlled switching and rectifier circuits, the integrated thermo-electric engine can produce direct current for auxiliary power storage in a battery bank and high-density capacitor for on-board electric power generation and use by electric motors for vehicle propulsion. Alternately, the generated electrical current can be timed and phased to comprise a suitable stationary electrical power supply.

The focus of this invention is primarily directed at the integration of the internal combustion reciprocator unit with the linear power generator unit. It is contemplated that conventional, state-of-the-art electrical components will be utilized to accomplish the necessary signal transformation to provide electrical power for the particular application desired. Because of the extreme, high-efficiency of the thermal conversion to electrical power in the described system, the electrical power generation for vehicle propulsion should produce less pollution per mile of payload delivered, than all-electric vehicles buying electrical power from conventional stationary power production facilities.

These and other features of this invention will be apparent from a consideration of the multiple embodiments disclosed and described in greater detail in the Detailed Description of the Preferred Embodiments.

BRIEF DESCRIPTION OF THE DRAWINGS

FIG. 5 is a cross sectional view of the opposed-piston reciprocator unit and generator unit of FIG. 1 detailing the assembly of the units.

FIG. 6 is a side elevational view of a rotary pressure valve associated with the configuration of the thermo-electric engine FIG. 5.

DETAILED DESCRIPTION OF THE PREFERRED EMBODIMENTS

Figure 1:
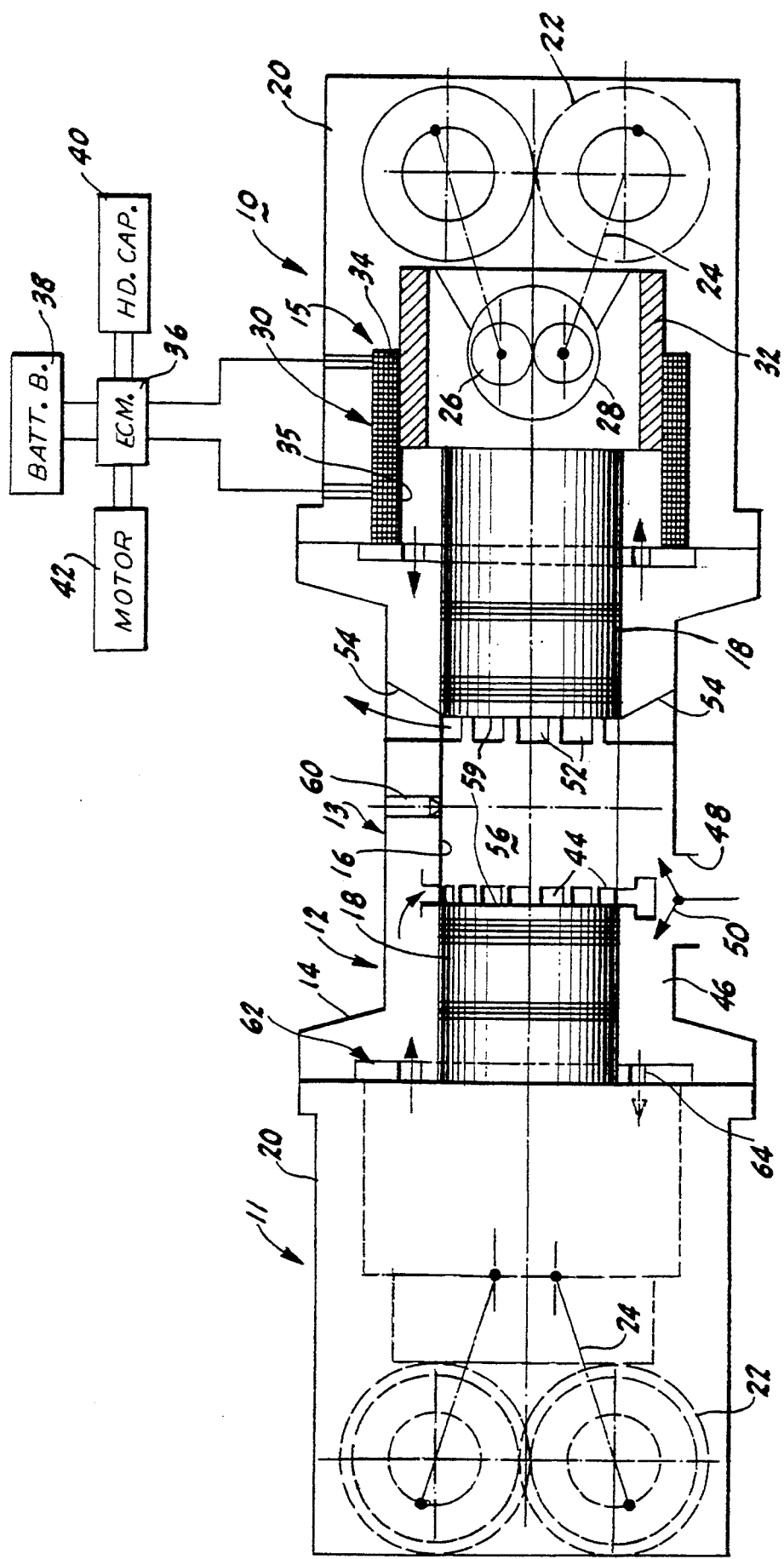
FIG. 1 is a schematic illustration of the opposed-piston reciprocator unit and linear electrical generator unit forming the thermo-electric engine of this invention.

Referring to FIG. 1, the integrated thermo-electric engine is shown and designated generally by the reference numeral 10. The thermo-electric engine 10 has a reciprocator assembly 11 with a three-segment housing 12 containing the combined internal combustion unit 13 and generator unit 15. The three-segment housing includes a central section 14 having a cylinder 16 in which is reciprocated a pair of opposed, power pistons 18. The housing 12 has identical end sections 20, each containing a pair of crankshafts 22 with connected connecting rods 24. The three sections of the housing 12 are interconnected by elongated tension bolt assemblies 25, as shown in FIG. 5.

The connecting rods 24 have wrist pins 26 that are in mutual rolling contact in a piston skirt assembly 28. The end sections 20 of the housing 12 also encase a linear generator assembly 30 with a linear inductor piston 32 coupled to each power piston 18 and a stationary linear coil-stator 34. The inductor piston 32 comprises a permanent magnet and is preferably of a ceramic composition that can withstand moderately high temperatures that result from its coupling to the piston and its complimentary function as a high pressure compressor piston. The two magnetic poles of the inductor piston 32 are substantially aligned with the longitudinal axis of the cylinder 16 and coil stator 34, which is substantially in line with the direction of reciprocation as taught in Taishoff, U.S. Pat. No. 4,631,455 and as well known in the art. The coil-stator 34 comprises a high performance coil in the form of annulus 35 that is electronically connected to an electronic control module 36. When using the thermo-electric engine as a power plant for vehicle propulsion, the control module 36 includes switching and rectifying circuitry for use of the generated pulse power for supplying a battery bank 38 and high density capacitor 40. In such application, the electronic control module 36 also regulates the power supply to one or more propulsion motors that drive the vehicle.

As noted, the integrated thermo-electric engine has particular application for use in a hybrid power plant for propulsion of a vehicle, but may also be used as a stationary power plant or as a portable power plant for other high-energy applications.

The use of dual connecting rods 24 and dual cranks 22 eliminate all side thrusts of the power piston 18 and coupled inductor piston 32. Since the inductor piston 32 reciprocates together with the coupled power piston 18, it is advantageously situated for use as a piston-type compressor.

In the embodiment shown, the engine 10 is a two-cycle engine with the cylinder 16 having peripheral intake ports 44 communicating with an internal compressed air plenum 46 within the central section of the housing 12. The internal plenum 46 in turn has an air intake orifice 48 protected by a flap valve 50. Similarly, the cylinder 16 has peripheral exhaust ports 52 that align with a series of exhaust passages 54 for discharge of exhaust gases from the combustion chamber 56, defined by the cylinder 16 and the ends 59 of the opposed power pistons 18. In conventional practice, the exhaust ports 52 are slightly elongated along the linear axis of the cylinder to allow the exhaust ports 52 exposed before the air intake ports 44 when the power pistons retract, as shown, such that exhaust gases first pass through the exhaust ports before intake air scavenges the remaining gases and charges the combustion chamber 56. One or more fuel injectors 60 supply diesel fuel, gasoline, methanal, liquid natural gas, or other combustible fuel. As noted by appropriate alteration, a compressed gaseous fuel can be supplied to the combustion chamber 56 where appropriate.

In order to regulate the air supply, the central section 14 of the housing includes intake valves 62 and air supply valves 64. The valves regulate the respiration of the inductor piston when functioning as a compressor. The preferred configuration of these valves is shown with reference to FIGS. 5 and 6, with air management is coordinated with the engine speed.

Figure 2:
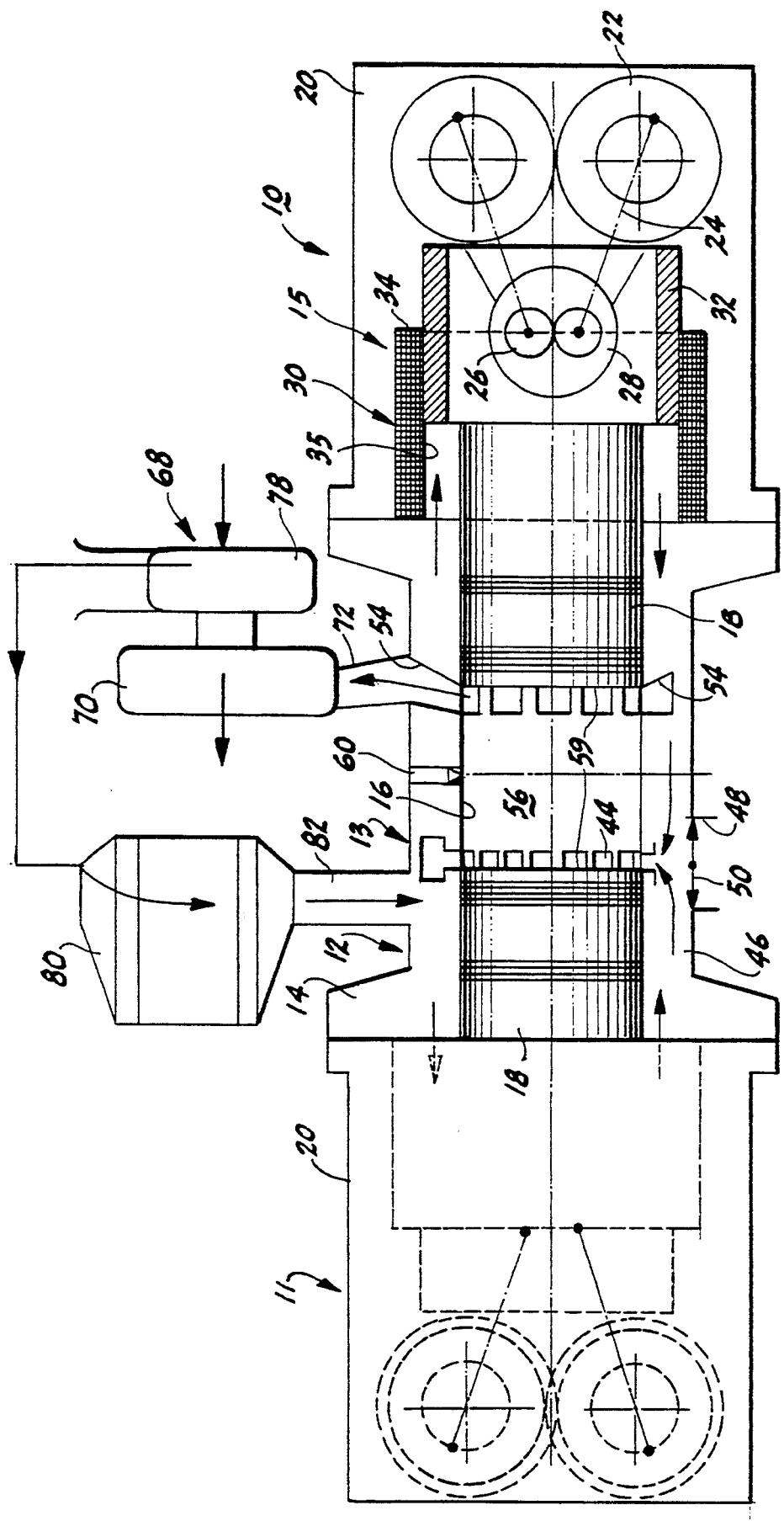
FIG. 2 is a schematic illustration of the opposed-piston reciprocator unit and generator unit of FIG. 1 with an auxiliary turbocharger.

Referring now to FIG. 2, the thermo-electric engine 10 includes the reciprocator assembly 11 of FIG. 1 in combination with a turbocharger 68. The turbocharger 68 has a turbine section 70 with a conduit 72 coupled to the exhaust passage 54 of the combustion chamber 56. The turbine section 70 drives a compressor section 78 that draws and compresses air which is delivered to an intercooler 80 for passage by conduit 82 to the intake plenum 46 for compression by the reciprocating inductor piston 32 before admission into the combustion chamber 56.

Figure 3:
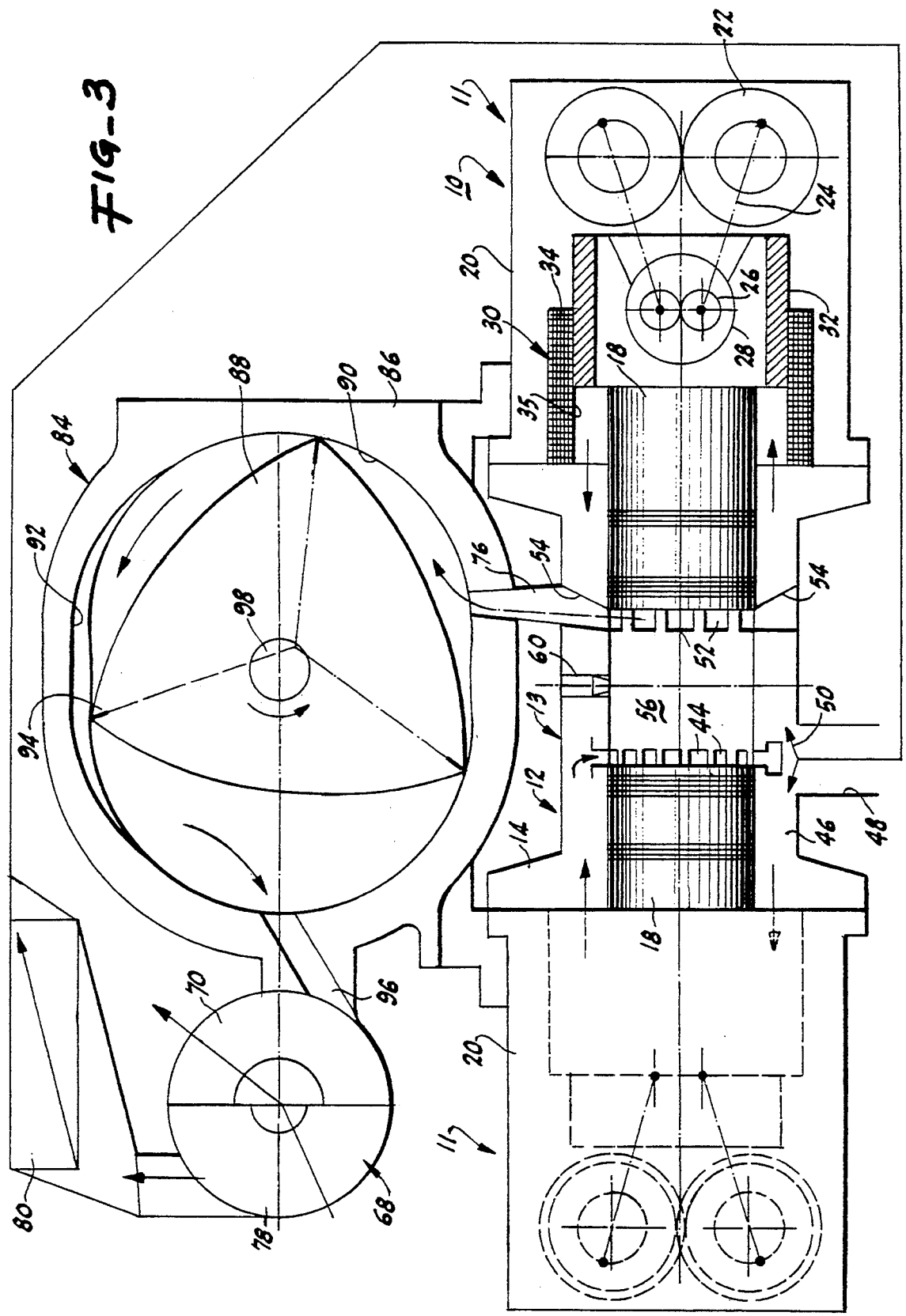
FIG. 3 is a schematic illustration of the opposed-piston reciprocator unit and linear generator unit of FIG. 1 with an auxiliary rotary expander-compressor.

Referring now to FIG. 3, the thermo-electric engine 10 includes the reciprocator assembly of FIG. 1 in combination with a positive-displacement, rotary-expander 84 having a housing 86 containing a rotary piston 88. The rotary piston 88 rotates in a chamber 90 in the manner of a Wankel-type piston in an epitrochoidal engine block. To maximize the expansion ratio of the expander 86, a bypass slot 92 allows passage of expanding gases to flow from one side of the expander to the other. In this manner, the housing 86 provides a single expansion phase for each of the three chambers formed between the lobes 94 of the three-lobed piston 88. The expander 84 discharges its expanded gases through a discharge passage 96 to the turbine section 70 of the turbocharger 68.

The expanded combustion gases enter the expander 84 from the exhaust passage 54 of the combustion unit 13 of the reciprocator assembly 11 through discharge conduit 76. Any mechanical power from the expander 84 is obtained at the shaft 98 and may be utilized as the drive for an alternator or other device for supplemental supply of electrical power for operation of auxiliary electrical systems. After discharge through the turbine section, of the turbocharger 68, the exhaust gases are discharged to atmosphere. The turbine section 70 of the turbocharger 68 drives the rotary compressor section 78 for compression of intake air. Compressed air is delivered through intercooler 80 for entry into the intake plenum 46 of the combustor unit 13 via intake passage 48.

Figure 4:
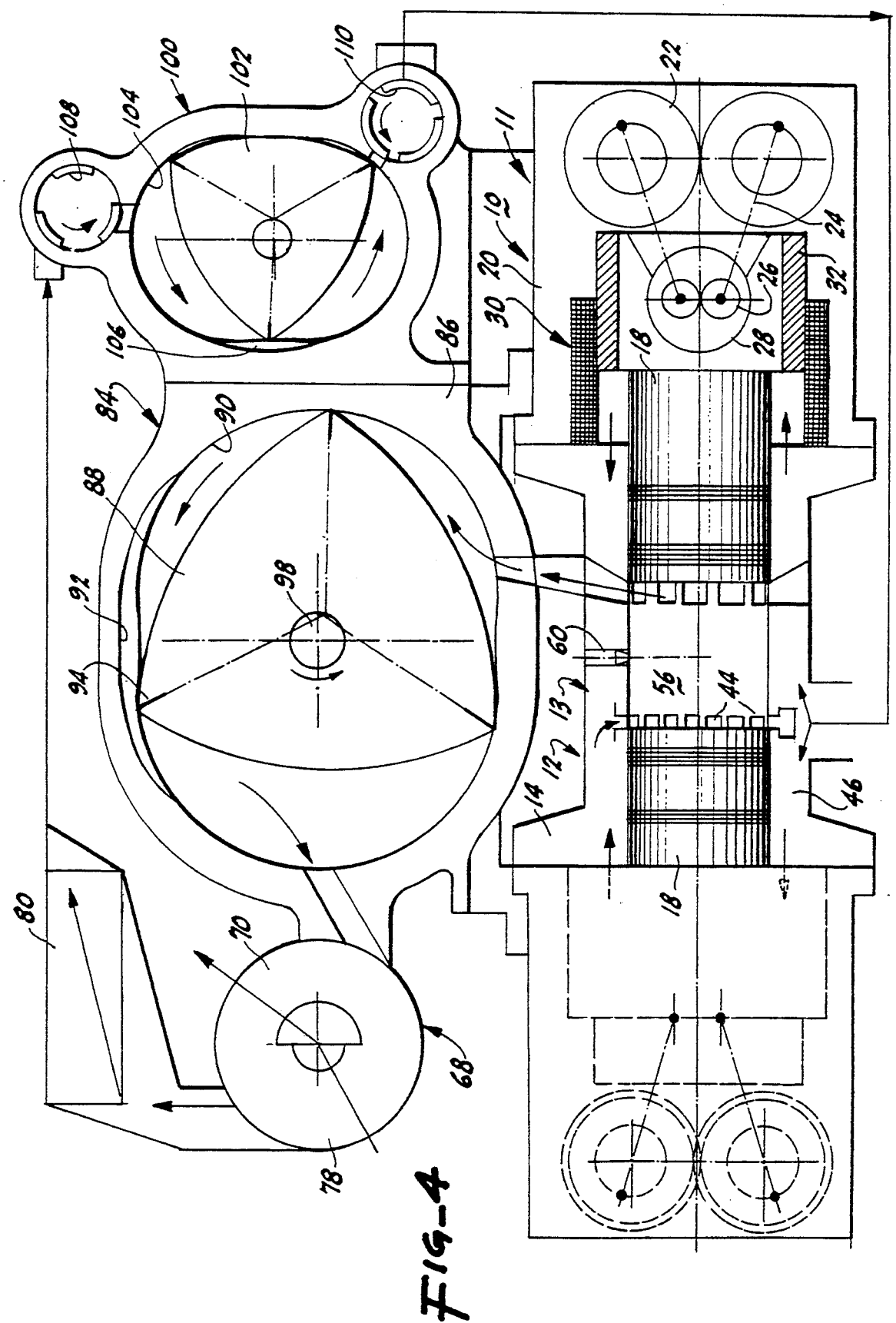
FIG. 4 is a schematic illustration of the opposed-piston reciprocator unit and linear generator unit of FIG. 1 with a rotary expander, a rotary compressor and a turbocharger.

For maximized efficiency and highest pressure operation, the compound system of FIG. 3 is supplemented by a positive-displacement, rotary compressor component 100 as shown in FIG. 4. The rotary compressor component 100 serves as a secondary stage of compression to boost the compressed air from the turbocharger 68 before delivery of the precompressed air to the reciprocator unit 11. The rotary compressor 100 is constructed similar to the construction of the expander with a rotary piston 102 in a chamber 104 having a bypass channel 106 for maximizing the compression ratio of the air delivered to the compressor 100 from the turbocharger 68. The compressor unit 100 is sized somewhat smaller than the expander 84 to accommodate the inherent density differential between the hot and cool gases being passed, respectively, from and to the reciprocator 11. The compressor 100 has a cylinder-shaped rotary intake valve 108 and a similar rotary discharge valve 110 timed to maximize the intake and discharge of air in the compressor unit 100. In the embodiment of FIG. 4, air undergoes a four stage compression being compressed in the first stage by the compressor section 78 of the turbocharger 68 where compressed air is passed through the intercooler 80 to the rotary compressor unit 100, and hence to the intake plenum 46 of the reciprocator unit 11. In the reciprocator unit 11, the reciprocating inductor piston 32 acts as a positive-displacement compressor piston to charge the combustion chamber 56 of the combustion unit 13 before final compression by the power pistons 18.

Referring now to FIGS. 5 and 6, an internal view of the reciprocator unit 11 illustrates the interrelationship of the components forming the integration of the combustor unit 13 and the generator unit 15. With particular reference to the piston skirt assembly 28 it is shown that the rolling wrist pins 26 seat in a hemispherical bearing member 116 contained by a retainer 118, which also abuts and retains the linear inductor piston 32. The inductor piston 32 has a step-fit with the skirt of the power piston 18 and, as noted, is secured by the retainer 118. To improve compression, a pair of rings 119 are incorporated in the inductor piston 32, which reciprocates in the cylindrical annulus 120 formed by the reinforced coil 121 of the stationary stator 34.

To properly time the compression action of the inductor piston 32, a rotating disk valve 122 is installed between the reciprocating inductor piston 32 and the air plenum 46. The face of the intake valve 122 is shown in FIG. 6. The disk is fabricated from a graphite fiber material and is rotated by a timing gear 124 that contacts the perimeter of the disk valve 122. The timing gear 124 is connected to the crankshaft as schematically illustrated in FIGS. 5 and 6 by interconnection line 126. The disk valve 122 has a slot 128 for intake and a slot 130 for supply to the combustion chamber 56 on periodic alignment with the intake passage 132, which is partially eclipsed in FIG. 6. This valve is designed to rotate without lubrication and can be seated in teflon or other slide bearing interface.

During operation, each fore and aft stroke of the linear inductor piston 32 in the high density coil annulus 120 of the linear stator 34 produces a sinusoidal pulse of current. Depending on the application, this current pulse can be transformed by the electronic control module 36 for the particular application desired. It is to be understood that the electronic control module as schematically shown in FIG. 1 is incorporated into each of the alternate embodiments shown.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A thermo-electric engine comprising:
   a) an internal combustion unit having a cylinder formed in a first housing section with at least one power piston with thermal means for reciprocating the power piston in the cylinder, the power piston and cylinder defining a combustion chamber, and,
   b) a generator unit having a linear inductor piston coupled to the power piston for reciprocation together with the power piston and a stationary coil stator constructed in the configuration of an annulus, formed in a second housing section, wherein the inductor piston reciprocates in the annulus of the coil stator and electrical current is generated in the coil stator, and, wherein the first housing section of the power piston cylinder is connected to the second housing section of the inductor piston annulus with the stationary coil stator isolated from the cylinder that in part defines the combustion chamber.

2. The thermo-electric engine of claim 1 wherein the internal combustion unit and generator unit have a common housing formed by the first housing section coupled to the second housing section.

3. The thermo-electric engine of claim 1 wherein the linear inductor piston and the stator annulus are constructed as a piston operated air compressor, the piston compressor having valve means for regulating air respiration in the piston compressor.

4. The thermo-electric engine of claim 3 wherein the inductor piston has a diameter greater than the power piston and the valve means comprises an annular, rotating disk ring with apertures, and, the combustion chamber cylinder has an outer air plenum with the end wall having an air passage, the apertures of the disk ring periodically aligning with the air passage of the air plenum on rotation of the disk ring.

5. The thermo-electric engine of claim 1 wherein the internal combustion unit has opposed power pistons, each power piston having a coupled inductor piston, wherein each inductor piston has an associated coil stator in the configuration of an annulus formed by a second housing section.

6. The thermo-electric engine of claim 5 wherein the opposed power pistons have a bearing assembly and are each connected to twin connecting rods having parallel wrist pins in mutual rolling contact in the bearing assembly, the connecting rods each having an opposite end connected to a crankshaft.

7. The thermo-electric engine of claim 6 in combination with a turbocharger.

8. The thermo-electric engine of claim 7 in further combination with a positive-displacement rotary expander interposed between the combustion chamber and the turbocharger.

9. The thermo-electric engine of claim 8 in further combination with a positive-displacement rotary compressor interposed between the combustion chamber and turbocharger.

10. The thermo-electric engine of claim 1 in combination with an electronic control module having circuit means for electric power supply.

* * * * *